United States Patent Office 3,321,143
Patented May 23, 1967

3,321,143
METHOD OF PRODUCING GRANULATED ALUMINUM
Vernon D. Claiborne, Leawood, Kans., assignor to U.S. By-Products Corporation, Kansas City, Mo., a corporation of Missouri
No Drawing. Filed Nov. 16, 1964, Ser. No. 411,612
7 Claims. (Cl. 241—23)

This invention relates to the production of aluminum powder and, more particularly, to a method of producing aluminum of reduced particle size by a grinding operation, the particles thereby produced having a granulated character.

It is the primary object of my invention to provide a method of producing granulated aluminum wherein aluminum bulk is sequentially treated in a novel manner to yield an aluminum powder of the granular variety. As is well known in the aluminum metallurgy field, aluminum powder is manufactured in two general classifications, flake-like particles and granular forms. Flake-like particles find primary use in the paint field where aluminum pigments are highly advantageous due to unique properties of visibility, electrical and thermal conductivity, reflectance and protection against many types of corrosive elements.

Granulated aluminum has been extensively used for pyrotechnic, explosive and chemical applications. It is also suitable as a starting material for the above-mentioned flake particles used in pigments. The three common forms of granulated aluminum are referred to as atomized aluminum, grained aluminum and flat-granulated aluminum. These types have been successfully employed in various applications and each has proven to be highly important in industry. However, the inherent processes required in these methods of production result in relatively high cost and, therefore, an economic detriment cannot be completely avoided. Economic factors would, of course, also limit the possible uses of granulated aluminum even where it may effectively be applied in contrast to cheaper materials.

It is, therefore, an important object of the present invention to provide a method of producing granulated aluminum wherein a grinding method is employed for size reduction as opposed to the prior methods of producing this material. Specifically, the use of a grinding operaton avoids the costly necessity of melting the aluminum and treating the same in a molten state to produce granules as is required by each of the old processes. My development therefore, considerably reduces the cost of producing granulated aluminum while at the same time yields a product which may be used for many applications now being served by prior granulated forms.

It is another object of this invention to provide a method of producing granulated aluminum wherein two independent grinding operations are performed by suitable mills on the aluminum to reduce the particle size thereof in a definite sequential manner. Each grinding mill is operated at a predetermined speed to assure proper size reduction to protect against the formation of fine powder which is not desired as it presents an explosive hazard.

A yet further object of this invention is to provide a method of producing granulated aluminum in the aforementioned manner whereby the aluminum is ground into particles of critical sizes in each grinding operation so that an optimum product is obtained with respect to both economy and superior physical qualities. In particular, the critical sizes are obtained through use of a pair of hammer mills, each of which is operated to yield a specific size of aluminum particles through its exit screens, the particles exiting from the second mill being the desired finished granular product.

It is yet another object of the instant invention to provide a method for producing granulated aluminum as above described wherein the feed aluminum may be any one of a variety of inexpensive scrap aluminum materials. It is noteworthy that the effectiveness of the subsequent final product is not noticeably reduced in any manner. This utilization of scrap aluminum where pure aluminum would give essentially no better result, of course, means additional savings to the manufacturer.

Other objects include definite critical operating conditions to give optimum results and these factors will be fully explained hereinafter in the detailed specification. The bulk aluminum used as a starting material in my method of producing granulated aluminum may be any one of several forms of scrap aluminum which may be easily and cheaply obtained. Such forms may include borings, turnings, shavings, grindings, spinnings, sawings, filings, scalpings, buffings, punchings, drillings scrapings, etc. This light aluminum scrap usually contains up to 25% cutting oils and solvents and up to 3% contamination by iron filings. It will, of course, be recognized that pure aluminum could be used, but the ultimate product would not be superior to that obtained by using scrap aluminum and its cost would be considerably higher.

Due to cutting oils and solvents being introduced to the aluminum during grinding and milling operations in which the scrap was formed, a suitable drying operation must be performed prior to grinding the aluminum. This may be accomplished by placing the scrap in a rotary kiln at temperatures from 300° F. to 800° F. until only a trace of the oil and solvents remains, which, for all practical purposes, renders the aluminum completely dry.

The dried scrap aluminum is then run through a magnetic separator to remove the iron filings. The drying and demagnetizing pre-treatment steps are optional, particularly if relatively pure aluminum scrap is used but will normally be required for scrap obtained from the above-mentioned grinding and milling operations.

The dried and de-magnetized aluminum is then introduced for pre-grinding into a first hammer mill which is operating at 1500–2000 r.p.m. The exit screen of the hammer mill is provided with openings of .125 to .375 inch so that when the particle size of the aluminum is sufficiently reduced by the hammer mill, the particles will pass through the screen openings.

The pre-ground aluminum is then transferred for final grinding operations to a second hammer mill which is operating at 3600 r.p.m. The exit screen in this mill is provided with openings from .020 to .075 inch and as the pre-ground aluminum is reduced in particle size it is allowed to pass through the openings. The shape of the granulated aluminum particles exiting from the second mill is substantially irregular and varies from a flattened flake to a slightly spheroidal configuration. It is to be emphasized that best results are obtained when the exit screens of the hammer mills contain openings within the above-mentioned critical ranges for each mill. I have found that highly satisfactory results may be obtained using a screen opening of ¼ inch in the first hammer mill and .05 inch in the second hammer mill, the mills operating at 1800 and 3600 r.p.m. respectively.

Since the screen employed in the second hammer mill is of such small mesh size, it is highly desirable to place a heavier backing screen adjacent to the same to cushion the load carried by the fine mesh screen. The backing screen is provided with openings of one-quarter to three-quarters of an inch and thus does not substantially hamper the progress of the particles passing through the openings in the fine screen. This results in a considerably longer life of the fine screen and this is a very important economic factor as such screens are quite costly.

The final ground product is run through a screen-toscreen operation wherein the top screen is 30 mesh and the bottom screen is 200 mesh (U.S. Standard Sieve size). Particles retained on the 30 mesh screen are then recycled through the second hammer mill. Particles retained on the 200 mesh screen are bagged and prepared for shipping.

When using exit screens within the critical range limits and with the speeds of the hammer mills being 1800 and 3600 r.p.m. respectively, the product leaving the second hammer mill has been found to yield an approximate range of mesh sizes as follows.

| Mesh: | Percent |
|---|---|
| +30 | 0 |
| −30 +40 | 30–50 |
| −40 +50 | 20–40 |
| −50 +80 | 20–40 |
| −80 +100 | 5–15 |
| −100 +200 | 3–10 |
| −200 | 0–3 |

It will be appreciated that aluminum may be constantly fed to each hammer mill to yield a continuous grinding operation. Therefore, a substantial amount of scrap aluminum may be processed with relatively limited equipment and facilities. By continuously passing the reduced aluminum particles out of the hammer mills, there is no opportunity for the individual particles to become overheated through friction and subsequently welded together. This advantage obviates the need for a grinding lubricant or other protective wet method.

It is anticipated that smaller sizes of aluminum particles could be obtained by hammer mill grinding, but powder sizes under 200 mesh fall within the hazardous explosive range of aluminum. Elaborate equipment, such as inert gas facilities or wet method apparatus, would be necessary to protect against explosion possibilities and such equipment would obviously incur considerable expense. Since most uses of granulated aluminum may be performed by particles larger than 200 mesh, it will be generally desirable to avoid the fine powder hazardous range.

As is well known in the aluminum metallurgy field, there are three common processes for producing granulated powder. Atomized aluminum is produced by placing a nozzle in a pool of molten aluminum and drawing the molten metal upwardly therethrough until it exits from a small orifice at the upper end of the nozzle. Hot air under pressure impinges on the stream of molten aluminum exiting from the orifice and breaks the stream into small particles which are then drawn with cooling air by suction through a collecting duct which is located above the nozzle. The particular size range obtained by this method may be varied from very fine (80% through a 325-mesh screen) to relatively coarse grades. The particles are commonly teardrop or substantially spherical in shape.

Grained aluminum is produced by slowly stirring molten aluminum as it is solidifying, thereby breaking it up into fine grains due to the "hot shortness" of aluminum at that temperature. This results in rough, irregularly-shaped grains varying in size from about 1/64 to 1/4 inch. Flat-granulated aluminum is made by pouring molten aluminum through a vibrating iron sieve, the particles then being allowed to fall into water for solidification. The size of these particles ranges up to 1/2 inch in diameter and have a relatively flattened shape.

The advantages of my method over the aforementioned processes is obvious. Each of the prior processes requires raising the temperature of the aluminum until it reaches a molten condition and then treating the liquid metal in carefully controlled processes to obtain the final granulated product. The apparatus used in the prior processes must be critically constructed to withstand the high temperature conditions and this necessitates results in considerable expense to the manufacturer in addition to the expensive provision of heating facilities required by each of the processes. In contrast, my process requires the use of only conventional equipment which is readily obtainable at relatively low cost and requires minimal upkeep. The critical factors for producing optimum granulated particles are limited to the rotational speed of the hammer mills and the mesh sizes of the exit screens as opposed to the need for critical temperature control in each of the abovementioned prior processes.

One of the primary uses for granulated aluminum has been in the explosives field. One common mixture utilizes a combination of ammonium nitrate, fuel oil and granulated aluminum. The powder obtained from my process has been found to be highly suitable for such a mixture and, in fact, is just as effective as atomized aluminum which has previously been used. Many other explosives employ aluminum powder and, therefore, my product will serve as a very important economical factor in the explosives field.

Other common uses for granulated aluminum powder have been in the pyrotechnic and chemical reduction field. Again, my product has been found to be completely satisfactory for such uses.

One of the primary uses of atomized granulated aluminum has been as a starting material for flake-particle production in the paint field. It is anticipated that, by providing suitable inert gas equipment in association with the apparatus required for my method as discussed above, granules of aluminum under 200 mesh size could be obtained as necessary for pigment production. Further experimentation would be necessary to determine the critical operating speeds of the hammer mills and exit screen sizes necessary for finer granulated aluminum production.

Thus, I have provided a method for producing granulated aluminum which affords excellent economical factors, while also yielding a favorable product. This product has been obtained through grinding methods to avoid the necessity of using molten aluminum as is necessary in prior granular production and, I have advantageously employed conventional industrial equipment. My process also successfully protects against explosive hazards even though a dry process is used without any lubricant or other protective wet method. Furthermore, the method is highly satisfactory even when using inexpensive scrap feed material. It should be emphasized that optimum results are obtained through use of a 2-step sequential grinding operation wherein the grinding speed and the particle size of the aluminum is maintained within critical limits.

Having thus described the invention, what is claimed as new and desired to be secured by Letters Patent is:

1. The method of producing granulated aluminum comprising the steps of:
   drying aluminum bulk;
   introducing the dried aluminum bulk into a first grinding mill;
   pre-grinding said aluminum to a reduced particle size;
   passing said reduced aluminum particles out of said first grinding mill;
   transferring said reduced aluminum particles to a second grinding mill;
   grinding said reduced aluminum particles to further reduce the size thereof; and
   passing said further reduced aluminum particles out of said second grinding mill.

2. The method as set forth in claim 1, wherein said reduced aluminum particles pass through openings of .125 to .375 inch upon passing out of said first grinding mill.

3. The method as set forth in claim 1, wherein said further reduced aluminum particles pass through openings of .020 to .075 inch upon passing out of said second grinding mill.

4. The method as set forth in claim 1, wherein is included the step of separating magnetic material from said aluminum bulk before introducing the latter into said first mill.

5. The method as set forth in claim 1, wherein said first and second grinding mills are hammer mills.

6. The method as set forth in claim 5, wherein said first hammer mill rotates at approximately 1500–2000 r.p.m.

7. The method as set forth in claim 5, wherein said second hammer mill rotates at approximately 3000–4000 r.p.m.

References Cited by the Examiner

UNITED STATES PATENTS

| | | | |
|---|---|---|---|
| 2,334,258 | 11/1943 | Gavin | 106—290 |
| 2,418,990 | 4/1947 | Sheldon | 241—51 |
| 2,450,492 | 10/1948 | Stevenson | 241—89 |
| 2,733,866 | 2/1956 | Bernard | 241—159 |
| 2,828,923 | 4/1958 | Kramer | 241—190 |

FOREIGN PATENTS

| | | |
|---|---|---|
| 152,278 | 1/1938 | Austria. |
| 126,021 | 5/1919 | Great Britain. |
| 199,000 | 10/1938 | Switzerland. |

WILLIAM W. DYER, JR., *Primary Examiner.*

H. F. PEPPER, JR., *Examiner.*